(12) United States Patent
Imura

(10) Patent No.: US 12,015,347 B2
(45) Date of Patent: Jun. 18, 2024

(54) CONTROL CIRCUIT FOR POWER CONVERTER APPARATUS OF DC TO DC CONVERTER FOR CONVERTING REFERENCE VOLTAGE TO DC VOLTAGE

(71) Applicant: Nisshinbo Micro Devices Inc., Tokyo (JP)

(72) Inventor: Masayuki Imura, Ikeda (JP)

(73) Assignee: NISSHINBO MICRO DEVICES INC., Tokyo (JP)

(*) Notice: Subject to any disclaimer, the term of this patent is extended or adjusted under 35 U.S.C. 154(b) by 350 days.

(21) Appl. No.: 17/596,219

(22) PCT Filed: Jun. 24, 2021

(86) PCT No.: PCT/JP2021/023988
§ 371 (c)(1),
(2) Date: Dec. 6, 2021

(87) PCT Pub. No.: WO2022/269871
PCT Pub. Date: Dec. 29, 2022

(65) Prior Publication Data
US 2022/0416654 A1 Dec. 29, 2022

(51) Int. Cl.
*H02M 3/158* (2006.01)
*H02M 1/00* (2006.01)
(52) U.S. Cl.
CPC ......... *H02M 3/158* (2013.01); *H02M 1/0032* (2021.05)
(58) Field of Classification Search
CPC .......................................... H02M 3/155–1588
See application file for complete search history.

(56) References Cited

U.S. PATENT DOCUMENTS

| | | | |
|---|---|---|---|
| 2005/0105311 A1* | 5/2005 | Soldano | H02M 1/0085 363/89 |
| 2008/0218145 A1* | 9/2008 | Xu | H02M 3/156 323/288 |

FOREIGN PATENT DOCUMENTS

| | | |
|---|---|---|
| JP | 2010-028898 | 2/1985 |
| JP | 2007-080478 | 3/2007 |

(Continued)

OTHER PUBLICATIONS

Jan. 4, 2024 Notification Of Transmittal Of Copies of Translation of the International Preliminary Report on Patentability in connection with PCT/JP2021/023988.

*Primary Examiner* — Peter M Novak
(74) *Attorney, Agent, or Firm* — Paul Teng

(57) ABSTRACT

A control circuit for a power converter apparatus includes a reference voltage source that generates a predetermined reference voltage; an output voltage detection circuit having a capacitor that charges the output voltage or a corresponding voltage, the output voltage detection circuit detecting a drop in the output voltage based on a voltage across the capacitor; a feedback voltage output circuit including two voltage-divider resistors connected in series with each other with a voltage divider ratio set according to the reference voltage and the output voltage, the feedback voltage output circuit outputting a feedback voltage obtained by dividing the output voltage; a voltage comparison circuit that compares the reference voltage with the feedback voltage, and outputs a comparison result signal; and a drive control circuit configured to control intermittent operation in accordance with the comparison result signal and a detection signal of the output voltage detection circuit.

14 Claims, 4 Drawing Sheets

(56) References Cited

FOREIGN PATENT DOCUMENTS

| | | |
|---|---|---|
| JP | 2013-062947 | 4/2013 |
| JP | 6460592 B2 | 1/2019 |
| WO | 2019/187544 A1 | 10/2019 |

\* cited by examiner

CONTROL CIRCUIT FOR POWER CONVERTER APPARATUS OF DC TO DC CONVERTER FOR CONVERTING REFERENCE VOLTAGE TO DC VOLTAGE

TECHNICAL FIELD

The present invention relates to a control circuit and a control method for a power converter apparatus, such as a DC to DC converter, for example, and a power converter apparatus.

BACKGROUND ART

One of the control methods of DC to DC converters is called VFM (Variable Frequency Modulation) control, which is a control method to vary the switching frequency according to the magnitude of the load current. When the load current is small, the frequency is lowered, and the switching operation stops. The VFM control is a control method that varies the switching frequency according to the load current.

PRIOR ART DOCUMENTS

Patent Document:
Patent Document 1: Japanese Patent No. JP6460592B2

SUMMARY OF INVENTION

Problem to be Solved by Invention

However, in the conventional VFM-controlled DC to DC converter, in order to maintain the output voltage even in the time interval where the switching operation is stopped, it is necessary to detect a drop in the output voltage caused by the load current. Therefore, the power supply to the reference voltage source, the feedback resistors, and the VFM control comparator cannot be stopped, and the current consumption of these components reduces the efficiency under light load.

The purpose of the present invention is to solve the above problems and to provide a control circuit and control method for a power converter apparatus and a power converter apparatus that can stop power supply to unnecessary circuits including a reference voltage source, feedback resistors, and a VFM control comparator, and that can increase efficiency under light load as compared to the conventional technology.

Means for Dissolving the Problems

According to one aspect of the present invention, there is provided a control circuit for a power converter apparatus that converts a first DC voltage into a predetermined second DC voltage, and outputs the second DC voltage as an output voltage. The control circuit includes a reference voltage source, an output voltage detection circuit, a feedback voltage output circuit, a voltage comparison circuit, and a drive control circuit. The reference voltage source generates a predetermined reference voltage, and the output voltage detection circuit has a capacitor that charges the output voltage or a corresponding voltage, and detects a drop in the output voltage based on a voltage across the capacitor. The feedback voltage output circuit includes two voltage-divider resistors connected in series with each other with a voltage-divider ratio set according to the reference voltage and the output voltage, and the feedback voltage output circuit outputs a feedback voltage obtained by dividing the output voltage. The voltage comparison circuit compares the reference voltage with the feedback voltage, and outputs a comparison result signal indicating comparison result, and the drive control circuit is configured to control intermittent operation in accordance with the comparison result signal and a detection signal of the output voltage detection circuit.

Effect of the Invention

Therefore, according to the control circuit for the power converter apparatus, etc. of the present invention, the power supply to unnecessary circuits including the reference voltage source, the feedback resistors, and the VFM control comparator can be stopped by using a new output voltage detection circuit using a capacitor, and the efficiency under light load can be increased compared with the conventional technology. In this way, the efficiency under light load can be improved as compared with the conventional technology.

BEST MODE FOR CARRYING OUT INVENTION

The following is a description of embodiments and modified embodiments of the present invention with reference to the drawings. The same numerical references are attached to the same or similar components.

Findings of the Inventor

The embodiment of the present invention has the following features in the configuration and control operation in a switching stop time interval of the boosting DC to DC converter. In other words, the target output voltage is held in the capacitor built into the output voltage detection comparator. In a switching stop time interval, the held voltage is used as the reference voltage, and the output voltage is monitored directly without dividing the voltage by the feedback resistors, so the operation of the reference voltage source and the feedback resistors becomes unnecessary, and the power supply to them can be stopped. The output voltage is monitored directly without voltage divider by the feedback resistors.

EMBODIMENT

Figure 1:
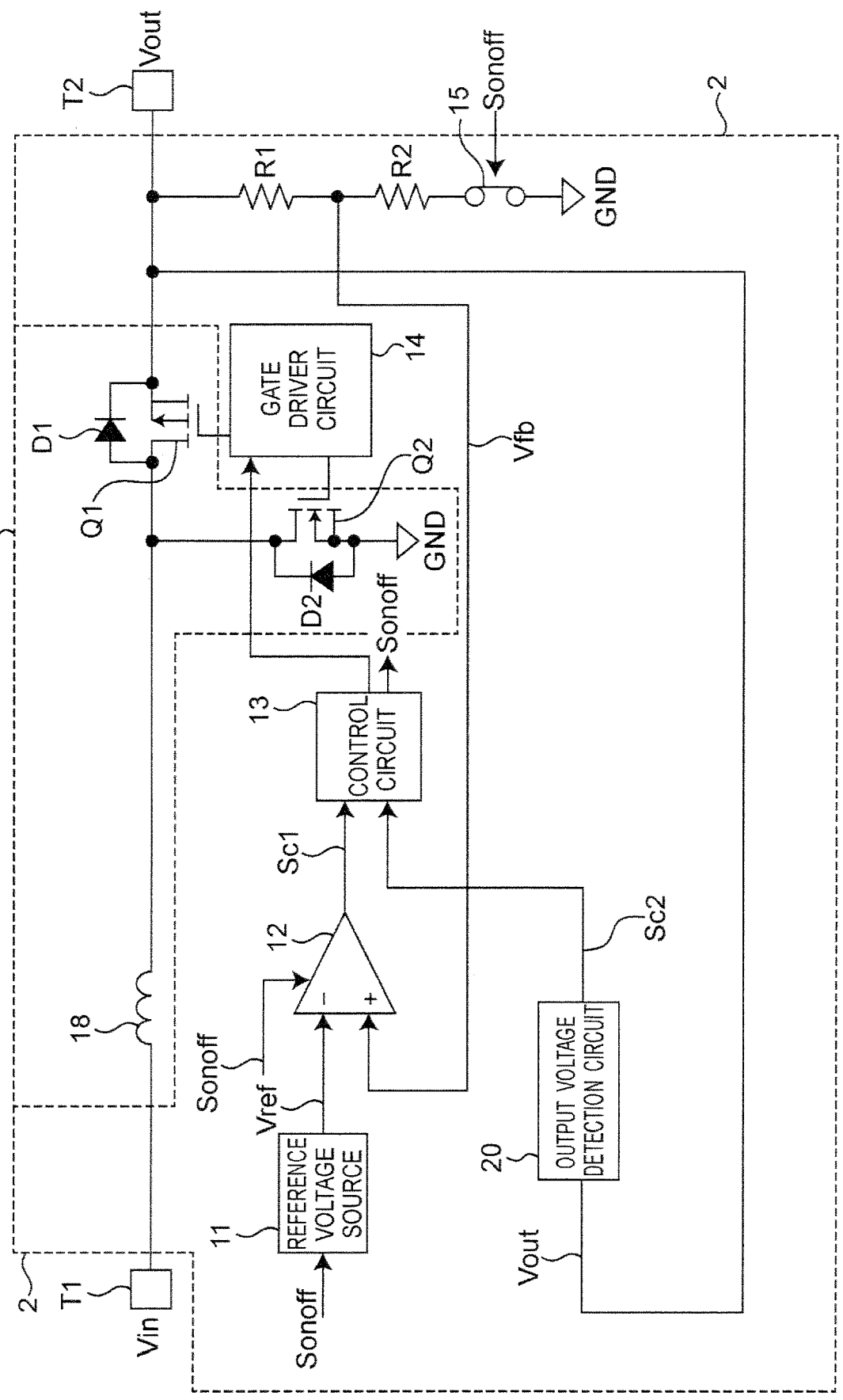
FIG. 1 is a circuit diagram showing an example of configuration of a boosting DC to DC converter 1 and its control circuit 2.

FIG. 1 is a circuit diagram showing an example of configuration of a boosting DC to DC converter 1 and its control circuit 2 according to an embodiment. Referring to FIG. 1, the boosting DC to DC converter 1 is a non-isolated boosting DC to DC converter, and is configured to includes a P-channel MOS transistor Q1, an N-channel transistor Q2, and a gate driver circuit 14. In addition, the control circuit 2 for the DC to DC converter 1 is configured to include a reference voltage source 11, a VFM control comparator 12, a drive control circuit 13, feedback voltage-divider resistors R1 and R2, a switch 15, and an output voltage detection circuit 20. The feedback voltage-divider resistors R1 and R2 configures a feedback voltage output circuit.

In this case, the comparator 12 compares the first voltage applied to the non-inverting input terminal with the second voltage applied to the inverting input terminal, and outputs a H-level output signal Sc1, which is a comparison result signal when the first voltage the second voltage. On the other hand, the comparator 12 outputs a L-level output signal Sc1, which is a comparison result signal when the first voltage<the second voltage. When the first voltage<the second voltage, the output signal Sc1 of the L-level is outputted. The output voltage detection circuit 20 is a circuit using a switched capacitor circuit including the built-in capacitors C1 and C2 illustrated in FIGS. 2A and 2B, and detects a drop in the output voltage Vout based on the voltage of the built-in capacitors C1 and C2 that charge the output voltage Vout or a corresponding voltage, and generates and outputs a H-level or L-level output signal Sc2 indicating the detection result.

The drive control circuit 13 is configured to include a predetermined control logic circuit, and based on the input output signals Sc1 and Sc2, outputs a drive control signal to the gate driver circuit 14 for ON/OFF control of the MOS transistors Q1 and Q2 during voltage boost operation, as described below, and also outputs an H-level ON/OFF signal representing the ON signal to execute voltage boost operation. The gate driver circuit 14 outputs an H-level ON/OFF signal Sonoff representing the ON signal to execute the voltage boost operation, and the L-level ON/OFF signal Sonoff representing the OFF signal to stop the voltage boost operation during non-operation of the voltage boost. Furthermore, the gate driver circuit 14 controls turning on/off by applying a predetermined gate signal to the gate of the MOS transistor Q1 or Q2 based on the drive control signal from the drive control circuit 13.

A general VFM-controlled boost DC to DC converter is mainly used for applications that emphasize efficiency under light load, and is configured to include a reference voltage source 11, a VFM control comparator 12, a drive control circuit 13 configured to include, for example, a control logic circuit, a gate driver circuit 14 that amplifies and drives the gate voltage, the MOS transistors Q1 and Q2, the feedback voltage-divider resistors R1 and R2, and an inductor 18. In addition, as an additional configuration in this embodiment, the DC to DC converter includes an output voltage detection circuit 20 with the built-in capacitors C1 and C2 (see FIG. 2A and FIG. 2B) and the switch 15. In this case, the series circuit of the inductor 18 and the MOS transistor Q1 are inserted between the input terminal T1 and the output terminal T2, and the connection point between the inductor 18 and the drain of the MOS transistor Q1 is grounded through the source and drain of the MOS transistor Q2. Preferably, smoothing capacitors (not shown) are connected between the input terminal T1 and the ground, and between the output terminal T2 and the ground, for example.

First of all, the operation of a general VFM-controlled boost DC to DC converter is described as follows.

The DC to DC converter is an example of a voltage regulator that outputs a constant output voltage Vout even if the input voltage Vin and the load current vary. Especially, when the output voltage is higher than the input voltage, the boost DC to DC converter 1 is used. As an assumption, the switch 15 is in the ON state, and as an example, 1.5V is applied as the input voltage Vin, and the set voltage of 3V is outputted as the output voltage Vout. The reference voltage Vref of the reference voltage source 11 is set to 1V, and the voltage divider ratio of the feedback voltage dividers R1 and R2 is R1:R2=2:1, so that one-third of the output voltage is outputted as the feedback voltage Vfb. Therefore, the reference voltage Vref×3=3V becomes the set value of the output voltage. In this case, as the initial state, the MOS transistors Q1 and Q2 are set to an OFF-state.

First of all, when the output voltage Vout decreases due to an increase in the load such as a load device connected to the output terminal T2 of the output voltage Vout, the feedback voltage Vfb divided by the feedback voltage-divider resistors R1 and R2 also decreases. For example, when the output voltage Vout decreases by 2.7V from 3V, the feedback voltage Vfb becomes 0.9V. At this time, the VFM control comparator 12 compares the feedback voltage Vfb=0.9V with the reference voltage Vref=1V, and determines that Vfb<Vref and the output voltage Vout has decreased, and inverts the output signal Sc1 of the VFM control comparator 12 from the H-level to the L-level. Next, the drive control circuit 13 receives the aforementioned inverted L-level output signal Sc1, and starts the voltage boost operation from the input voltage Vin to the output voltage Vout. In this case, there are mainly the following three operation phases P1 to P3.

As the phase P1, the MOS transistor Q2 is turned on by the gate signal from the gate driver circuit 14. At this time, the input voltage Vin causes a current to flow in the direction of ground (GND) through the inductor 18 and the MOS transistor Q2, which generates a magnetic field in the inductor 18, and charges the inductor 18 with energy.

As the phase P2, the MOS transistor Q2 is turned off, and MOS transistor Q1 is turned on by the gate signal from gate driver circuit 14. At this time, a back electromotive force is generated in the inductor 18, and a current flows through the MOS transistor Q1 in the direction from the input terminal T1 of the input voltage Vin to the output terminal T2 of the output voltage Vout, causing the lowered output voltage to rise.

As the phase P3, the MOS transistor Q1 is turned off when the current due to the aforementioned back EMF no longer flows.

The above operation is repeated by the drive control circuit 13. When the output voltage Vout rises above the desired 3V, the feedback voltage Vfb becomes higher than the reference voltage Vref, and the signal of the VFM control comparator 12 is inverted again, the drive control circuit 13 stops the voltage boost operation.

Generally speaking, when the boost operation is stopped, the drive control circuit 13 outputs the L-level ON/OFF signal Sonoff representing an OFF signal, to the unnecessary circuit blocks to suppress the current consumption of the relevant boosting DC to DC converter and make the same converter highly efficient under light load. However, it is not possible to stop the operation of the reference voltage source 11, the VFM control comparator 12, and the feedback voltage-divider resistors R1 and R2 to detect a drop in the output voltage Vout.

This embodiment is characterized in that when the voltage multiplier operation is stopped, the operation of the output voltage detection circuit 20 is stopped and the switches 15 provided in the feedback voltage-divider resistors R1 and R2 are turned off. Specifically, when a certain time interval of time has elapsed after the voltage multiplier operation is stopped, the drive control circuit 13 outputs the L-level ON/OFF signal Sonoff representing the OFF signal, to the reference voltage source 11, the VFM control comparator 12, and the switch 15, and the drop detection of the output voltage Vout is performed by the output voltage detection circuit 20. The output voltage detection circuit 20 detects the drop in output voltage Vout.

Figure 2A:
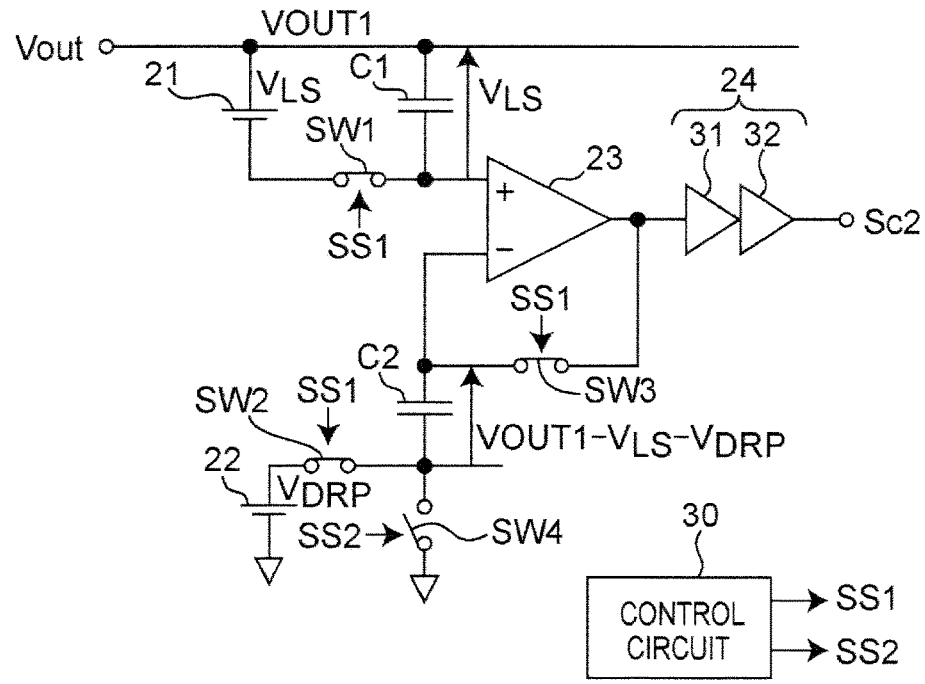
FIG. 2A shows a circuit of an example of configuration of an output voltage detection circuit 20 of FIG. 1, and an example of operation of a switching time interval of a phase 1.
Figure 2B:
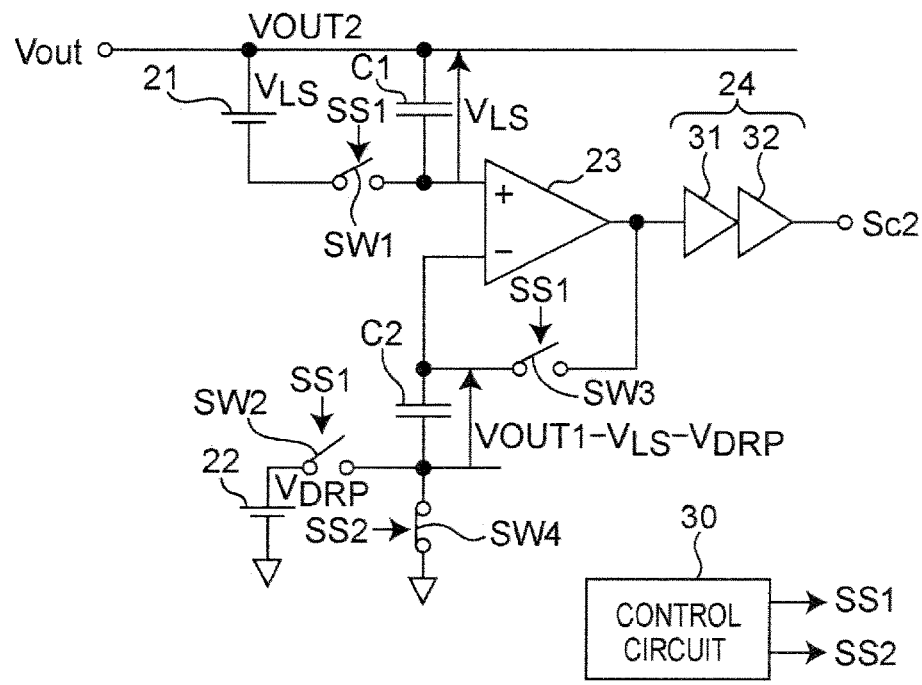
FIG. 2B shows a circuit of an example of configuration of the output voltage detection circuit 20 of FIG. 1, and the operation of a switching stop time interval in a phase 2.

FIG. 2A shows a circuit of an example of configuration of the output voltage detection circuit 20 of FIG. 1, and an example of operation during the switching time interval of the phase 1. FIG. 2B shows a circuit of an example of configuration of the output voltage detection circuit 20 of FIG. 1 and an example of operation of the switching stop time interval of the phase 2.

First of all, the configuration of the output voltage detection circuit 20 of FIG. 1 is described below with reference to FIGS. 2A and 2B.

The output voltage detection circuit 20 is a circuit using a switched capacitor circuit, and is configured to include DC voltage sources 21 and 22, a comparator 23, a buffer circuit 24 configured to include two inverters 31 and 32 connected in series with each other, built-in capacitors C1 and C2, switches SW1 to SW4, and a control circuit 30. In this case, the switches SW1 to SW4 are used. In this case, the switches SW1 to SW4 are of the MOS transistors, for example.

Referring to FIGS. 2A and 2B, the output voltage detection circuit 20 is configured to include the DC voltage sources 21 and 22, the comparator 23, the buffer circuit 24, the control circuit 30, the buffer circuit 24 configured to include inverters 31 and 32, and the built-in capacitors C1 and C2, which are switched capacitors. The DC voltage source 21 has a voltage $V_{LS}$, and the DC voltage source 22 has a voltage $V_{DRP}$.

The output voltage Vout is connected to the positive pole of the DC voltage source 21 and one end of the built-in capacitor C1, and the negative pole of the DC voltage source 21 is connected to the other end of the built-in capacitor C1 and the non-inverting input terminal of the comparator 23 through the switch SW1. The positive pole of the DC voltage source 22 is connected to one end of the switch SW4 and one end of the built-in capacitor C2 through the switch SW2, and the negative pole of the DC voltage source 22 and the other end of the switch SW4 are grounded. The other end of the built-in capacitor C2 is connected to the inverting input terminal of the comparator 23 and to the output terminal of the comparator 23 via the switch SW3. The output signal from the output terminal of the comparator 23 is outputted as the output signal Sc2 via the buffer circuit 24.

The control circuit 30 generates control signals SS1 and SS2, which have an inversion relation to each other, for controlling the operation of the switched capacitor circuit concerned. In the switching time interval of the phase 1, the control circuit 30 turns on the switches SW1 to SW3 by outputting the H-level control signal SS1 to the switches SW1 to SW3, while the control circuit 30 turns off the switch SW4 by outputting the L-level control signal SS2 to the switch SW4. Also, for the switching time interval of the phase 2, the control circuit 30 turns off the switches SW1 to SW3 by outputting the L-level control signal SS1 to the switches SW1 to SW3, while the control circuit 30 turns on the switch SW4 by outputting the H-level control signal SS2 to the switch SW4. In this case, the switching time interval and the switching stop time interval are sequentially repeated, alternately.

In the output voltage detection circuit 20 configured as described above, the switches SW1 to SW3 are turned on and the switch SW4 is turned off in the switching time interval of the phase 1 of FIG. 2A. In this case, it is set that the output voltage Vout=VOUT1. By returning the output signal of comparator 23 to the inverting input terminal through the switch SW3, the two input terminals of comparator 23 are at the same potential. And accordingly, the two built-in capacitors C1 and C2 are charged with the voltage shown in FIG. 2A in the steady state. In other words, the built-in capacitor C1 is charged to the voltage $V_{LS}$, and the built-in capacitor C2 is charged to the voltage (VOUT1−$V_{LS}$−$V_{DRP}$).

Next, in the switching stop time interval of the phase 2 of FIG. 2B, the switches SW1 to SW3 are turned off, and the switch SW4 is turned on. If we assume that the output voltage Vout=VOUT2, and pay attention to the potentials at the two input pins of the comparator 23, we can see that:

when $VOUT2-V_{LS} < VOUT1-V_{LS}-V_{DRP}$, namely, when $VOUT2 < VOUT1-V_{LS}-V_{DRP}$, the output signal of the comparator 23 is logically inverted. In other words, the output voltage Vout is inverted when the voltage drops by the voltage $V_{DRP}$ from the voltage VOUT1 in the switching time interval.

As explained above, in the phase 2 of the output voltage detection circuit 20, when the output voltage Vout drops by a voltage $V_{DRP}$ from the output voltage Vout=VOUT1 in the phase 1, the output signal of the comparator 23 is inverted. The reason for level-shifting the voltage $V_{LS}$ and the output voltage of the comparator 23 is to facilitate the design of the comparator 23 by setting the common-mode input level of the comparator 23 to an arbitrary value. The reference voltage outputs of voltage $V_{DRP}$ and voltage $V_{LS}$ are not necessary during the phase 2, and it is preferable to turn off the power supplies of the DC voltage sources 21 and 22 to reduce the current consumption.

In the output voltage detection circuit 20, the output voltage Vout is applied to the built-in capacitor C1, and the built-in capacitor C1 is pre-charged. The voltage at both ends Vc1 is applied to the non-inverting input terminal of the comparator 23 to detect a drop in the output voltage Vout. In other words, the built-in capacitor C2 is pre-charged with the desired output voltage Vout, for example, 3V, and the voltage is applied to the inverting input terminal of the comparator 23 and used as the reference voltage of the comparator 23. Therefore, the reference voltage source 11 becomes unnecessary and its operation can be stopped. On the other hand, by directly comparing the output voltage Vout, it is no longer necessary to divide the voltage by the feedback voltage-divider resistors R1 and R2, so the switch 15 can be turned off. As a result, their current consumption can be suppressed, and the efficiency under light load can be further increased.

Figure 3:
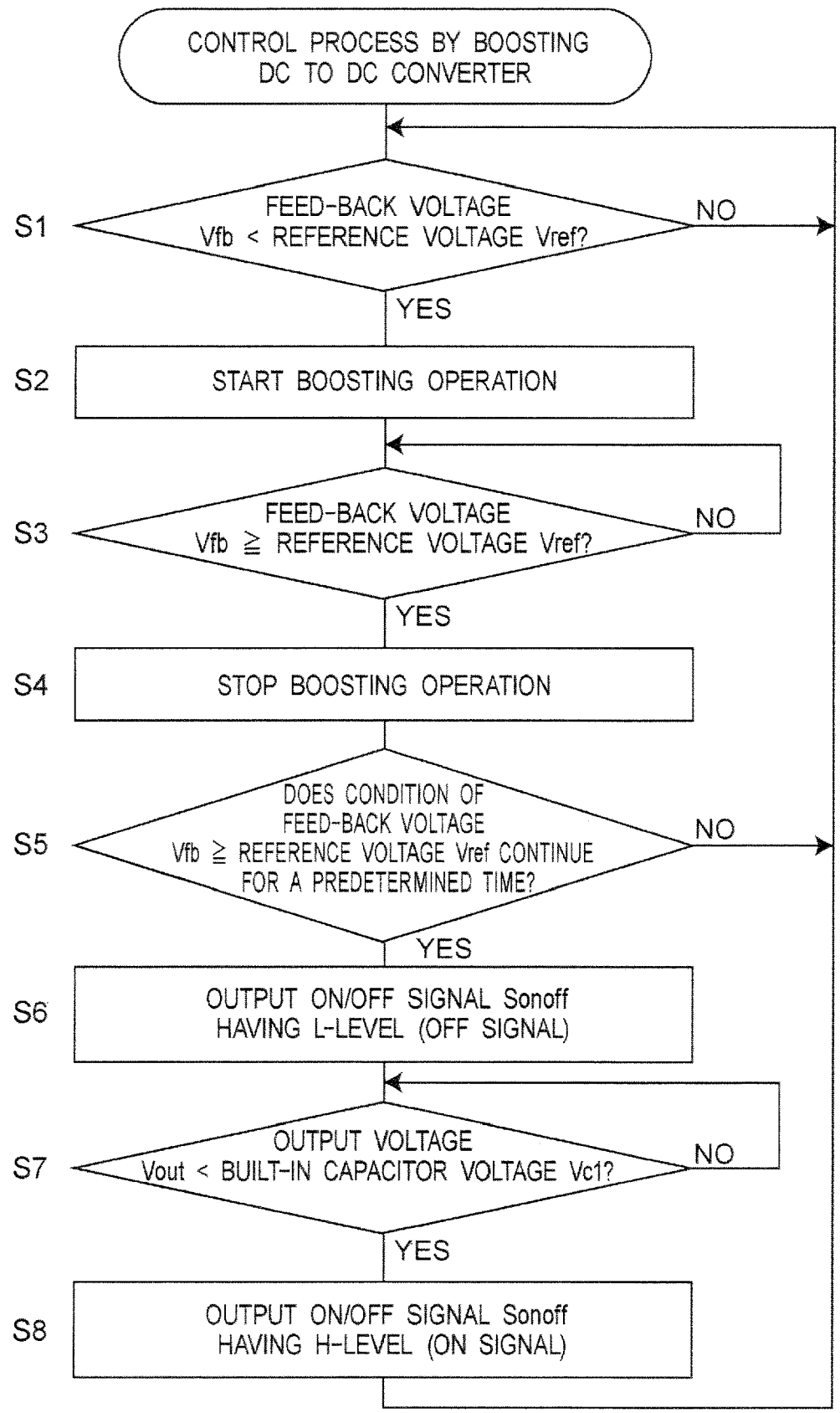
FIG. 3 is a flowchart of a control process of the boosting DC to DC converter executed by a control circuit 2 of FIG. 1.

FIG. 3 is a flowchart showing the control process of the boosting DC to DC converter executed by the control circuit 2 of FIG. 1. In this case, for the purpose of easy explanation of the VFM-control type boosting DC to DC converter 1, it is assumed that the start state is when the start-up is completed, and the output voltage has already reached the set voltage. In the preprocessing of step S1, it is assumed that the ON/OFF signal Sonoff of the H-level representing the ON signal is outputted.

Referring to FIG. 3, first of all, when the output voltage Vout is reduced by the load device connected to the output terminal T2, the feedback voltage Vfb, which is the output voltage Vout divided by the feedback voltage-divider resistors R1 and R2, is also reduced. When the feedback voltage Vfb falls below the reference voltage Vref (YES in step S1), the MOS transistors Q2 and Q1 are turned on and off, and the voltage boosting operation is started (in step S2). Next, when the output voltage Vout rises due to the boost operation and the feedback voltage Vfb becomes higher than the reference voltage Vref (YES in step S3), the boost operation is stopped (in step 4S).

If the state in which the feedback voltage Vfb exceeds the reference voltage Vref continues for a predetermined time interval of time (for example, 5 to 10 seconds) after the voltage multiplier is stopped, the state is judged to be a light load state (YES in step S5), and the reference voltage source 11, the VFM control comparator 12, the switch 15, and other unnecessary circuit blocks are turned on/off at the L-level representing the OFF signal (in step S6), and proceed to step S7. On the other hand, if NO is found in step S5, the control flow returns to step S1.

In step S7, if the condition that the output voltage Vout<built-in capacitor Vc1 is detected by the output voltage detection circuit 20 (YES in step S7), the H-level ON/OFF signal Sonoff representing the ON signal is outputted to each of the aforementioned blocks (step S8), and the control flow returns to step S1. Therefore, when the output voltage Vout drops, the operation of the reference voltage source 11 and the feedback voltage-divider resistors R1 and R2 can be turned on to resume the regulation operation.

As explained above, by turning off the operation of unnecessary circuit blocks such as the reference voltage source 11 and the feedback voltage-divider resistors R1 and R2 during the time interval when the voltage boost operation is stopped, the current consumption can be suppressed and the efficiency under light load can be increased.

Figure 4:
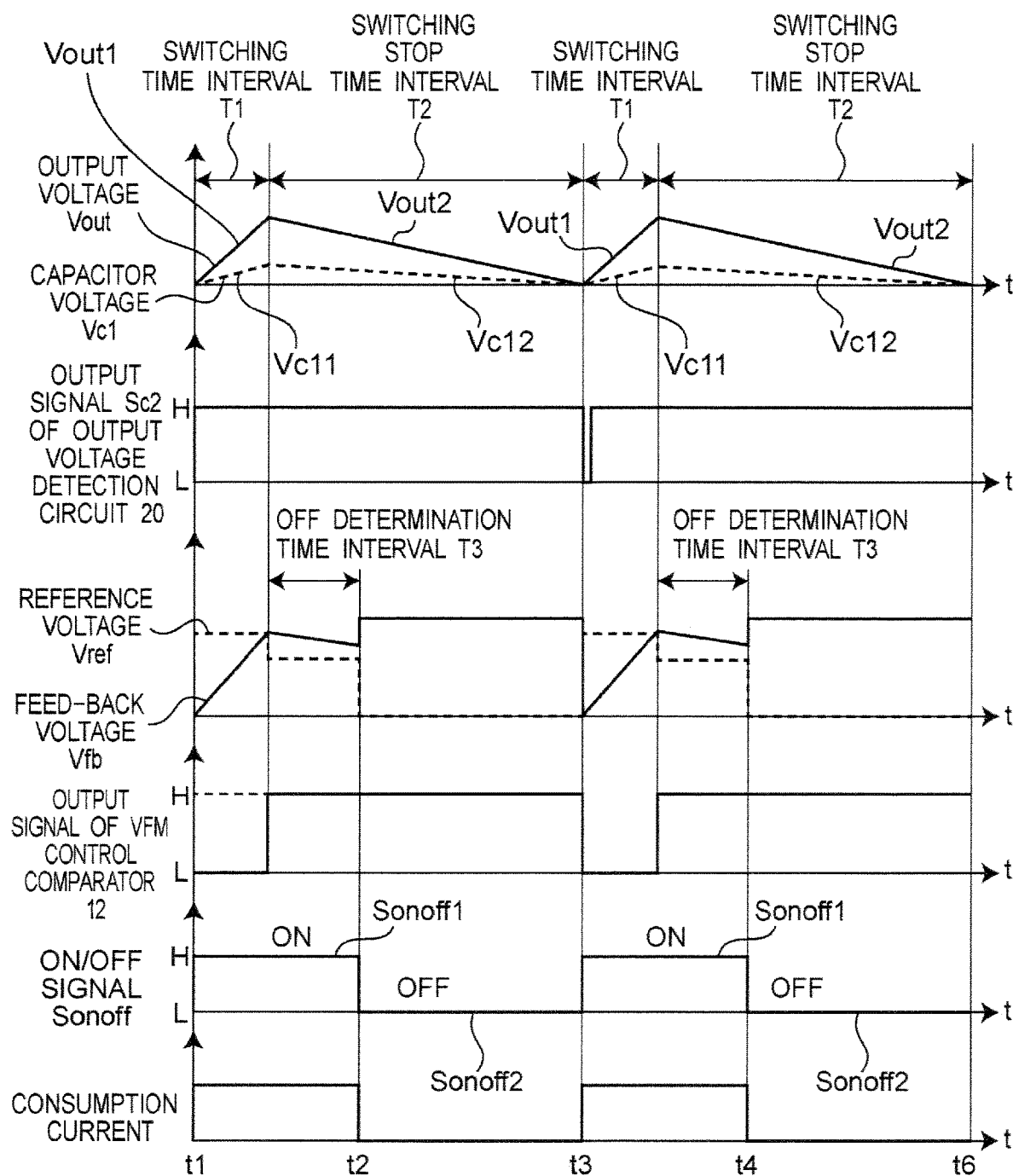
FIG. 4 is a timing chart showing operations of the boosting DC to DC converter a 1 and the control circuit 2.

FIG. 4 is a timing chart showing the operation of the boosting DC to DC converter 1 and the control circuit 2 of FIG. 1. In FIG. 4, the time interval from time t1 to t2 and from t3 to t4 is defined as a switching time interval T1, and the time interval from time t3 to t4 and from t5 to t6 is defined as a switching stop time interval T2.

In the switching time interval T1 of FIG. 4, when the feedback voltage Vfb<reference voltage Vref, then the DC to DC converter 1 performs switching operation and the output voltage Vout rises (Vout 1). At this time, the built-in capacitor C1 of the output voltage detection circuit 20 is charged, and its capacitor voltage Vc1 becomes the output voltage Vout or an equivalent voltage (neighbor voltage) (Vc11). Then, the switching operation (boost operation) is carried out until the feedback voltage Vfb the reference voltage Vref and the output signal Sc1 of the VFM control comparator 12 is inverted to the L-level. During this time, the ON/OFF signal Sonoff output from the drive control circuit 13 is at the H-level representing the ON signal, and the feedback voltage dividers R1 and R2, the reference voltage source 11, and the VFM control comparator 12 are made in the operating state (ON state). (Sonoff1).

Next, when the feedback voltage Vfb the reference voltage Vref, the output signal Sc1 of the VFM control comparator 12 is inverted to the H-level, and the DC to DC converter 1 stops the switching operation (switching stop time interval T2). At this time, the output voltage Vout gradually decreases due to the load current. This slope depends on the capacitance value connected to the output pin T2 and the magnitude of the load current (Vout2). When the output signal Sc1 of the VFM control comparator 12 is inverted to the L-level, the reference voltage Vref is lowered to provide hysteresis. However, this is an example, and there may be cases where hysteresis is not provided. The built-in capacitors C1 and C2 of the output voltage detection circuit 20 stop the charging operation, and hold the reference voltage for detecting the output voltage drop. Although the voltage Vc1 of the built-in capacitor C1 gradually decreases due to leakage current, etc., the decrease is within the range that does not pose any problem for detecting output voltage drop (Vc12).

The charge stopping and holding operation to the built-in capacitors C1 and C2 may be started when the OFF signal is outputted as shown below. That is, when the feedback voltage Vfb reference voltage Vref, namely, the state in which the output signal Sc1 of the VFM control comparator 12 is not reinverted to the L-level continues for more than the "OFF judgment time interval" (T3 in FIG. 4), the drive control circuit 13 outputs the ON/OFF signal Sonoff of the L-level representing the OFF signal The ON/OFF signal is outputted from the drive control circuit 13. With this signal, the operation of the feedback voltage-divider resistors R1 and R2, the reference voltage source 11, and the VFM control comparator 12 are turned off, and only the output voltage detection circuit 20 operates. Therefore, the current consumption becomes very small (Sonoff2 in FIG. 3). When the output voltage Vout drops to a predetermined voltage value, the output signal Sc2 of the output voltage detection circuit 20 is inverted to the H-level, and the switching operation is started again by outputting the ON/OFF signal Sonoff of the H-level representing the ON signal to each of the circuit blocks.

As explained above, by turning off the operation of unnecessary circuit blocks such as the reference voltage source 11 and the feedback voltage-divider resistors R1 and R2 during the time interval when the voltage boost operation is stopped (switching stop time interval T2 in FIG. 4), the current consumption can be suppressed and the efficiency under light load can be increased.

Modified Embodiments

In the above embodiment, during the time interval when the voltage multiplier operation is stopped (switching stop time interval T2 in FIG. 4), the L-level ON/OFF signal Sonoff is outputted to turn off the operation of unnecessary circuit blocks such as the reference voltage source 11, the VFM control comparator 12, and the feedback voltage-divider resistors R1 and R2. The present invention is not limited thereto, and the L-level ON/OFF signal Sonoff may be outputted to turn off the operation of any one circuit block selected among the reference voltage source 11, the VFM control comparator 12, and the feedback voltage-divider resistors R1 and R2.

Differences from Patent Document 1

Patent Document 1 discloses a method of holding a constant potential in a capacitor and stopping a band gap reference and reference bias circuit and reference voltage generation circuit during timer off for the purpose of increasing power efficiency. The method is similar to the present invention in that it indeed turns off the band-cap reference circuit or reference voltage source by holding a voltage in the capacitor to increase power efficiency. However, as mentioned above, the problem that the power efficiency is still low has not been solved because the feedback resistors cannot be turned off and current consumption is generated.

In addition to the configuration of a general VFM control type DC to DC converter, a new output voltage detection circuit 20 with built-in capacitors C1 and C2 is provided. In this case, in the switching time interval T1, the output voltage targeted for switching operation is biased against the aforementioned built-in capacitor C1, and in the switching stop time interval T2, a predetermined voltage value is maintained. In the switching stop time interval T2, the drop in the output voltage Vout can be detected using the retained target output voltage as the reference voltage. The monitoring of the output voltage Vout does not need to be done through the feedback voltage-divider resistors R1 and R2 because the target output voltage is used as the reference voltage. Therefore, the operation of the reference voltage source 11 and the feedback voltage dividers R1 and R2 are no longer necessary and can be turned off. Therefore, by using a new output voltage detection circuit 20 with built-in capacitors C1 and C2, the operation of not only the reference voltage source 11 but also the feedback voltage dividers R1 and R2 can be turned off, and the efficiency under light load can be improved more than the conventional technology. In addition to the reference voltage source 11, the operation of the feedback voltage dividers R1 and R2 can be turned off by using the voltage detection circuit 20. In this way, the efficiency under light load can be increased more than in the conventional technology.

As described in detail above, according to the control circuit for the power converter apparatus of the present invention, the power supply to unnecessary circuits including the reference voltage source, the feedback voltage-divider resistors and the VFM control comparator can be stopped by using a new output voltage detection circuit using a capacitor, and the efficiency under light load can be improved as compared with the conventional technology. In this way, the efficiency under light load can be improved compared to conventional technologies.

The invention claimed is:

1. A control circuit for a power converter apparatus that converts a first DC voltage into a predetermined second DC voltage, and outputs the second DC voltage as an output voltage, the control circuit comprising:
   a reference voltage source that generates a predetermined reference voltage;
   an output voltage detection circuit having a capacitor that charges the output voltage or a corresponding voltage, the output voltage detection circuit detecting a drop in the output voltage based on a voltage across the capacitor, and outputting a detection signal indicating that the drop is detected;
   a feedback voltage output circuit including two voltage-divider resistors connected in series with each other with a voltage divider ratio set according to the reference voltage and a setting voltage of the output voltage, the feedback voltage output circuit outputting a feedback voltage obtained by dividing the output voltage;
   a voltage comparison circuit that compares the reference voltage with the feedback voltage, and outputs a comparison result signal indicating comparison result; and
   a drive control circuit configured to control intermittent operation in accordance with the comparison result signal and the detection signal of the output voltage detection circuit, wherein
   in the intermittent operation, the power converter apparatus repeats (i) a switching interval during which the power converter apparatus performs switching operation to convert the first DC voltage and (ii) a switching stop interval during which the switching operation is stopped, and
   during the switching interval, the output voltage detection circuit charges a charge voltage, the charge voltage being obtained by which the capacitor subtracts a predetermined drop voltage from the output voltage, or the charge voltage corresponding to the subtracted voltage, and
   during the switching stop interval, based on the voltage of the capacitor and the output voltage, the output voltage detection circuit detects a drop of the output voltage to output the detection signal.

2. A power converter apparatus that converts a first DC voltage into a predetermined second DC voltage, and outputs the second DC voltage as an output voltage, wherein
   the power converter apparatus comprises the control circuit of claim 1, and
   the power converter apparatus is a boosting DC to DC converter.

3. The power converter apparatus as claimed in claim 2, wherein the drive control circuit restarts operation of the reference voltage source, the feedback voltage output circuit, and the voltage comparison circuit, based on the detection signal.

4. The control circuit as claimed in claim 1, wherein the drive control circuit stops operation of any of the reference voltage source, the feedback voltage output circuit, and the voltage comparison circuits when the feedback voltage remains above the reference voltage for a predetermined time based on the comparison result signal.

5. The control circuit as claimed in claim 4, wherein the drive control circuit restarts operation of the reference voltage source, the feedback voltage output circuit, and the voltage comparison circuit, based on the detection signal.

6. A control circuit for a power converter apparatus that converts a first DC voltage into a predetermined second DC voltage, and outputs the second DC voltage as an output voltage, the control circuit comprising:
   a reference voltage source that generates a predetermined reference voltage;
   an output voltage detection circuit having a capacitor that charges the output voltage or a corresponding voltage, the output voltage detection circuit detecting a drop in the output voltage based on a voltage across the capacitor, and outputting a detection signal indicating that the drop is detected;
   a feedback voltage output circuit including two voltage-divider resistors connected in series with each other with a voltage divider ratio set according to the reference voltage and the output voltage, the feedback voltage output circuit outputting a feedback voltage obtained by dividing the output voltage;
   a voltage comparison circuit that compares the reference voltage with the feedback voltage, and outputs a comparison result signal indicating comparison result; and
   a drive control circuit configured to control intermittent operation in accordance with the comparison result signal and the detection signal of the output voltage detection circuit,
   wherein the drive control circuit stops operation of any of the reference voltage source, the feedback voltage output circuit, and the voltage comparison circuits when the feedback voltage remains above the reference voltage for a predetermined time based on the comparison result signal.

7. The control circuit as claimed in claim 6, wherein the drive control circuit restarts operation of the reference voltage source, the feedback voltage output circuit, and the voltage comparison circuit, based on the detection signal.

8. A power converter apparatus that converts a first DC voltage into a predetermined second DC voltage, and outputs the second DC voltage as an output voltage, wherein
   the power converter apparatus comprises the control circuit of claim 2, and
   the power converter apparatus is a boosting DC to DC converter.

9. The power converter apparatus as claimed in claim 8, wherein the drive control circuit restarts operation of the reference voltage source, the feedback voltage output circuit, and the voltage comparison circuit, based on the detection signal.

10. A control method for a power converter apparatus that converts a first DC voltage into a predetermined second DC voltage, and outputs the second DC voltage as an output voltage, the control method comprising steps of:
   by a reference voltage source, generating a predetermined reference voltage;
   by an output voltage detection circuit having a capacitor that charges the output voltage or a corresponding voltage, detecting a drop in the output voltage based on the voltage of the capacitor, and outputting a detection signal;
   by a feedback voltage output circuit, outputting a feedback voltage obtained by dividing the output voltage, by using two voltage-divider resistors connected in series with each other with a voltage divider ratio set according to the reference voltage and a setting voltage of the output voltage;
   by a voltage comparison circuit, comparing the reference voltage with the feedback voltage, and outputting a comparison result signal indicating comparison result; and
   controlling intermittent operation according to the comparison result signal and the detection signal, wherein
   in the intermittent operation, the power converter apparatus repeats (i) a switching interval during which the power converter apparatus performs switching operation to convert the first DC voltage and (ii) a switching stop interval during which the switching operation is stopped, and
   during the switching interval, the output voltage detection circuit charges a charge voltage, the charge voltage being obtained by which the capacitor subtracts a predetermined drop voltage from the output voltage, or the charge voltage corresponding to the subtracted voltage, and
   during the switching stop interval, based on the voltage of the capacitor and the output voltage, the output voltage detection circuit detects a drop of the output voltage to output the detection signal.

11. The control method as claimed in claim 10, further comprising a step of stopping operation of any of the reference voltage source, the feedback voltage output circuit, and the voltage comparison circuit when such a condition that the feedback voltage is above the reference voltage continues for a predetermined time interval of time based on the comparison result signal.

12. The control method as claimed in claim 11, further comprising a step of restarting the operation of the reference voltage source, the feedback voltage output circuit, and the voltage comparison circuit based on the detection signal.

13. A control method for a power converter apparatus that converts a first DC voltage into a predetermined second DC voltage, and outputs the second DC voltage as an output voltage, the control method comprising steps of:
   by a reference voltage source, generating a predetermined reference voltage;
   by a capacitor that charges the output voltage or a corresponding voltage, detecting a drop in the output voltage based on the voltage of the capacitor, and outputting a detection signal;
   by a feedback voltage output circuit, outputting a feedback voltage obtained by dividing the output voltage, by using two voltage-divider resistors connected in series with each other with a voltage divider ratio set according to the reference voltage and the output voltage;
   by a voltage comparison circuit, comparing the reference voltage with the feedback voltage, and outputting a comparison result signal indicating comparison result; and
   controlling intermittent operation according to the comparison result signal and the detection signal; and
   a step of stopping operation of any of the reference voltage source, the feedback voltage output circuit, and the voltage comparison circuit when such a condition that the feedback voltage is above the reference voltage continues for a predetermined time interval of time based on the comparison result signal.

14. The control method as claimed in claim 13, further comprising a step of restarting the operation of the reference voltage source, the feedback voltage output circuit, and the voltage comparison circuit based on the detection signal.

* * * * *